United States Patent [19]

Jacobson

[11] Patent Number: 4,529,002
[45] Date of Patent: Jul. 16, 1985

[54] PILOT-OPERATED BALL COCK VALVE

[75] Inventor: Edwin B. Jacobson, Grand Rapids, Mich.

[73] Assignee: Adac Plastics, Inc., Grand Rapids, Mich.

[21] Appl. No.: 636,849

[22] Filed: Aug. 1, 1984

[51] Int. Cl.³ .................. F16K 31/18; F16K 33/00
[52] U.S. Cl. .................. 137/414; 137/426; 137/451; 251/46
[58] Field of Search ............ 137/414, 426, 451, 434; 251/30, 38, 44, 45, 46

[56] References Cited

U.S. PATENT DOCUMENTS

| 279,685 | 6/1883 | Zane | 137/426 |
|---|---|---|---|
| 1,248,650 | 12/1917 | Gustafson | 137/414 |
| 2,143,204 | 1/1939 | McCormack | 137/414 |
| 2,588,242 | 3/1952 | Hunter | 251/46 |
| 3,074,684 | 1/1963 | Doyle | 137/414 |
| 3,145,729 | 8/1964 | Cordis | 137/414 |
| 3,429,333 | 2/1969 | Schoepe et al. | 137/414 |
| 3,495,803 | 2/1970 | Schoepe et al. | 137/414 |
| 4,299,248 | 11/1981 | Becker et al. | 137/414 |
| 4,453,563 | 6/1984 | Walters | 251/46 |

FOREIGN PATENT DOCUMENTS 502072  4/1951  Belgium ..................... 137/426

Primary Examiner—George L. Walton
Attorney, Agent, or Firm—Varnum, Riddering, Schmidt & Howlett

[57] ABSTRACT

A pilot-operated ball cock valve of the type wherein a vent to a pressure chamber is controlled by a lever arm to thereby control the flow of fluid through the valve. A movable rod is slidable in aligned relief and pilot conduit openings and has a valve sealing element carried on the rod. The valve sealing element is adapted to seal off the relief opening in one position of the rod and to open the relief opening in another position of the rod. Further, the sealing element is adapted to close off the pilot conduit between the pressure chamber and the inlet opening when the rod is in the other position. The valve is advantageously formed in two pieces which screw together through a threaded core. The float on the arm has a hole in an outer portion thereof and is rotatably mounted on the arm to adjust the buoyancy of the float and thereby adjust the height to which the arm will rise in the tank.

15 Claims, 4 Drawing Figures

4,529,002

PILOT-OPERATED BALL COCK VALVE

TECHNICAL FIELD

This invention relates to pilot-operated ball cock valves.

BACKGROUND ART

Ball cock valves are float-operated valve mechanisms, principally used as flush valves in a water closet. The valves are opened responsive to the dropping of a float, usually on a lever arm, when water is discharged from a water closet, and are closed when the float is raised to a fill position in the tank. There are many different types of float-operated ball cock valves. One such design is called a "pilot-operated valve." In a pilot-operated valve, equal pressure between the inlet and a pressure chamber on opposite sides of a flexible valve element seals the valve element against a valve seat. When water is discharged from the tank, the float-operated lever arm vents the pressure chamber to open the valve element and permit the passage of water through the valve seat. When the water closet fills to an appropriate height, the vent is closed and the valve element again seals the valve seat to cut off flow of water to the tank. Examples of such pilot-operated valves are found in the following U.S. patents:

| Weaver et al (issued June 22, 1909) | 925,538 |
| Gustafson (issued December 4, 1917) | 1,248,650 |
| McCormack (issued January 10, 1939) | 2,143,204 |
| Schoepe et al (issued February 25, 1969) | 3,429,333 |
| Schoepe et al (issued February 17, 1970) | 3,495,803 |

A pilot-operated valve for an air vent system is disclosed in the Becker et al U.S. Pat. No. 4,299,248, issued Nov. 10, 1981.

It is desirable to adjust the level to which the tank might fill. Various adjustment mechanisms have been provided. One such adjustment mechanism is disclosed in the British Secification No. 564,982 published Oct. 20, 1944. In this specification, a series of cork discs, eccentrically mounted on a supporting arm, provide the float function. Rotation of the cork discs with respect to the arm will change the level to which the arm rises in the water closet.

The patent to Steensen U.S. Pat. No. 1,756,398, issued Apr. 29, 1930, discloses a float valve for controlling the flow of water into a water tank. The float includes a hollow ball with a threaded, plugged opening for filling the ball with water to a desired level. The ball is threaded onto a lever arm.

DISCLOSURE OF INVENTION

In accordance with the invention, an improved ball cock valve is simple in construction, can be made from inexpensive molded materials and is very sensitive to small changes in water pressure.

The ball cock valve according to the invention comprising a housing with an inlet opening for receiving fluid from a source, an outlet opening for discharging fluid into a water closet, a passage including a valve seat between the inlet and outlet openings and a flexible valve element mounted on the downstream side of the valve seat for movement between a closed position, blocking off flow of fluid between the inlet and outlet openings and an open position allowing fluid to flow between the inlet and outlet openings. A first side of the flexible valve element is exposed to fluid pressure through an opening in the valve seat and a second side of the flexible valve element is exposed to fluid pressure from a pressure chamber formed in the housing. The pressure area defined by the pressure chamber is greater than the valve seat opening so that the flexible valve element is maintained in a closed position when fluid pressure on the first and second sides of the flexible valve element is equal. A relief opening is provided through the housing and in communication with the pressure chamber for venting pressure therein. A pilot conduit, separate from the valve-seat opening, provides a passage between the inlet opening and the pressure chamber. A pilot valve is provided in the relief opening and an actuator means, such as a float-operated lever arm, operates the pilot valve for controlling the flow of fluid through the relief opening.

The invention provides an improved pilot valve in which the relief opening and the pilot conduit have aligned openings and form valve seats. A movable rod slides in the aligned openings and a valve sealing member, carried by the rod, is adapted to seal off the relief opening in one position of the rod and, alternatively, to permit fluid flow through the relief opening in another position of the rod. Preferably, the valve sealing member is adapted to seal off the pilot conduit opening in the other position of the rod. Thus, the inlet opening communicates with the pressure chamber and the pilot conduit is sealed when the pilot rod is in the first position and the pilot conduit is open to vent pressure in the pressure chamber when the pilot rod is in the other position.

In accordance with a preferred embodiment of the invention, the central core of the pilot conduit is formed through the core. Further, the valve sealing member is an O-ring and a groove is provided on the rod for positioning of the O-ring. In the preferred embodiment, the housing is formed in upper and lower sections which are separable from each other. The central core extends upwardly from the lower section and has a threaded outer surface. The upper section has an annular receiving portion with an internal thread to threadably receive the threaded surface of the core and thereby secure the upper and lower sections of the housing together. The flexible valve element is received and clamped between the upper and lower housing sections. The outlet opening is a circular separation between the upper and lower sections.

Further according to the invention, the actuator means comprises an arm pivotably mounted to an upper portion of the housing and in contact with the rod. A hollow float is rotatably mounted on the arm and has an opening free from obstructions near an outer portion thereof to adjust the buoyancy of the float. Means are provided to selectively fix the float in any rotational position with respect to the arm.

The use of an O-ring provides an effective sealing element which can be quite small, yet which can seal against a smaller surface and be less susceptable to leakage. A relatively steep angle in the valve seat can be provided while remaining within the load limits of the valve. The valve is very sensitive to the O-ring seals and the use of the pilot rod avoids clogging of the valve due to debris in the water line. The valve is very responsive and discharges water quickly and quietly into the tank. The shut-off of the pilot conduit avoids unintentional shut-off of the valve and chattering of the valve which might otherwise occur without pilot water shut-off during filling.

BRIEF DESCRIPTION OF THE DRAWINGS

The invention will now be described with reference to the accompanying drawings in which like numbers are used to designate like parts and in which.

BEST MODE FOR CARRYING OUT THE INVENTION

Figure 1:
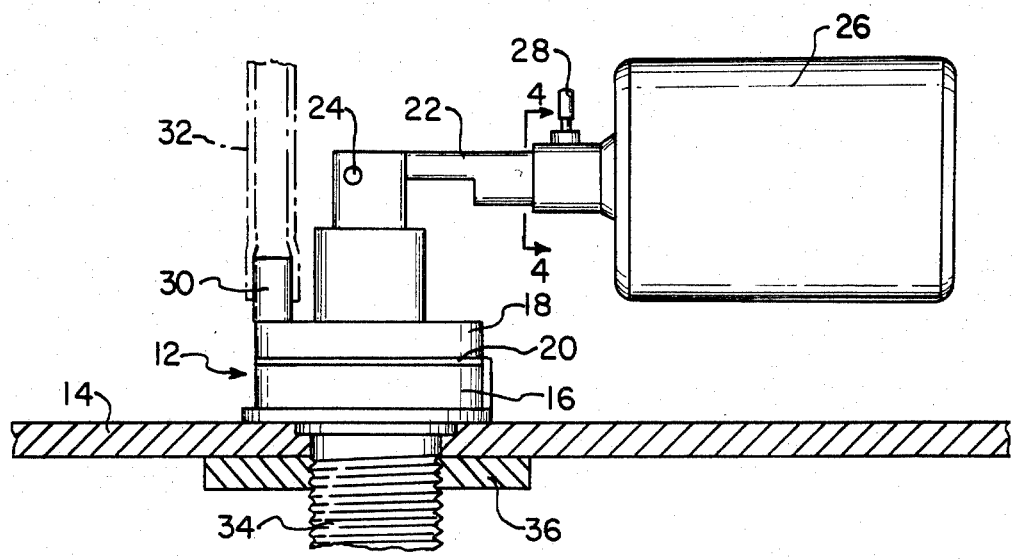
FIG. 1 is a side elevational view of a ball cock valve according to the invention shown in a water closet tank.

Referring now to the drawings and to FIG. 1 in particular, there is shown a ball cock valve 12 positioned in an opening in the bottom of a water closet 14. The ball cock valve 12 has a lower housing 16 and an upper housing 18 separated by a circular discharge gap 20. A lever arm 22 is pivotably mounted to the upper housing 18 through a pivot pin 24. A hollow float 26 is mounted on the end of the lever arm 22 and is rotatably adjustable thereon through a thumb screw 28. A back-fill outlet 30 is provided on the upper housing 18 and is connected to a back-fill tube 32 for filling a toilet bowl. A threaded inlet tube 34 is provided on the bottom of the lower housing 16 and a nut 36 is threaded onto the inlet tube 34 to firmly secure the lower housing 16 to the water closet tank 14. A water supply pipe (not shown) is connected to the threaded inlet tube 34 in conventional fashion.

Figure 2:
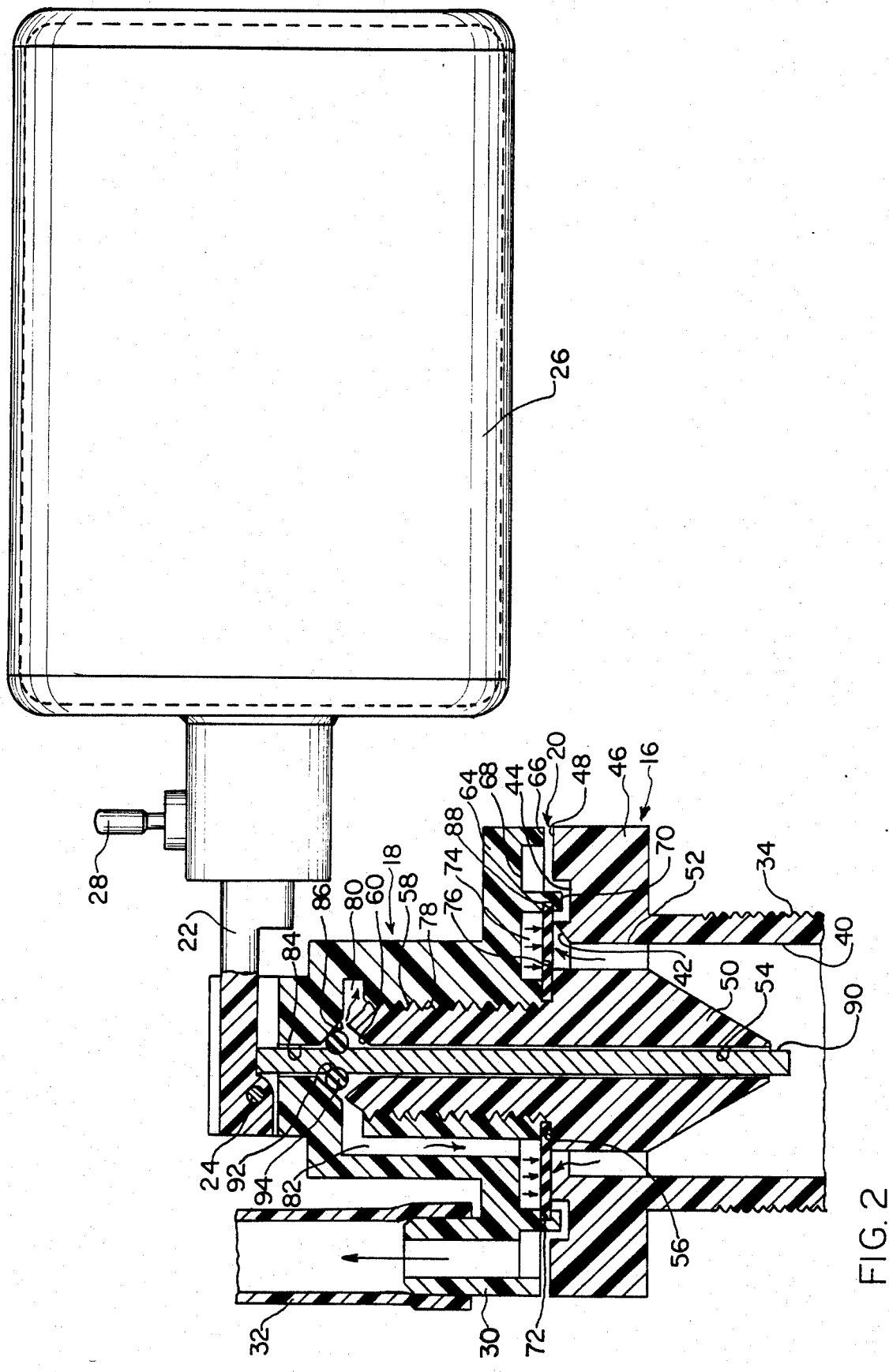
FIG. 2 is an enlarged view of the ball cock valve shown in FIG. 1 in vertical section showing the valve in the closed position.
Figure 3:
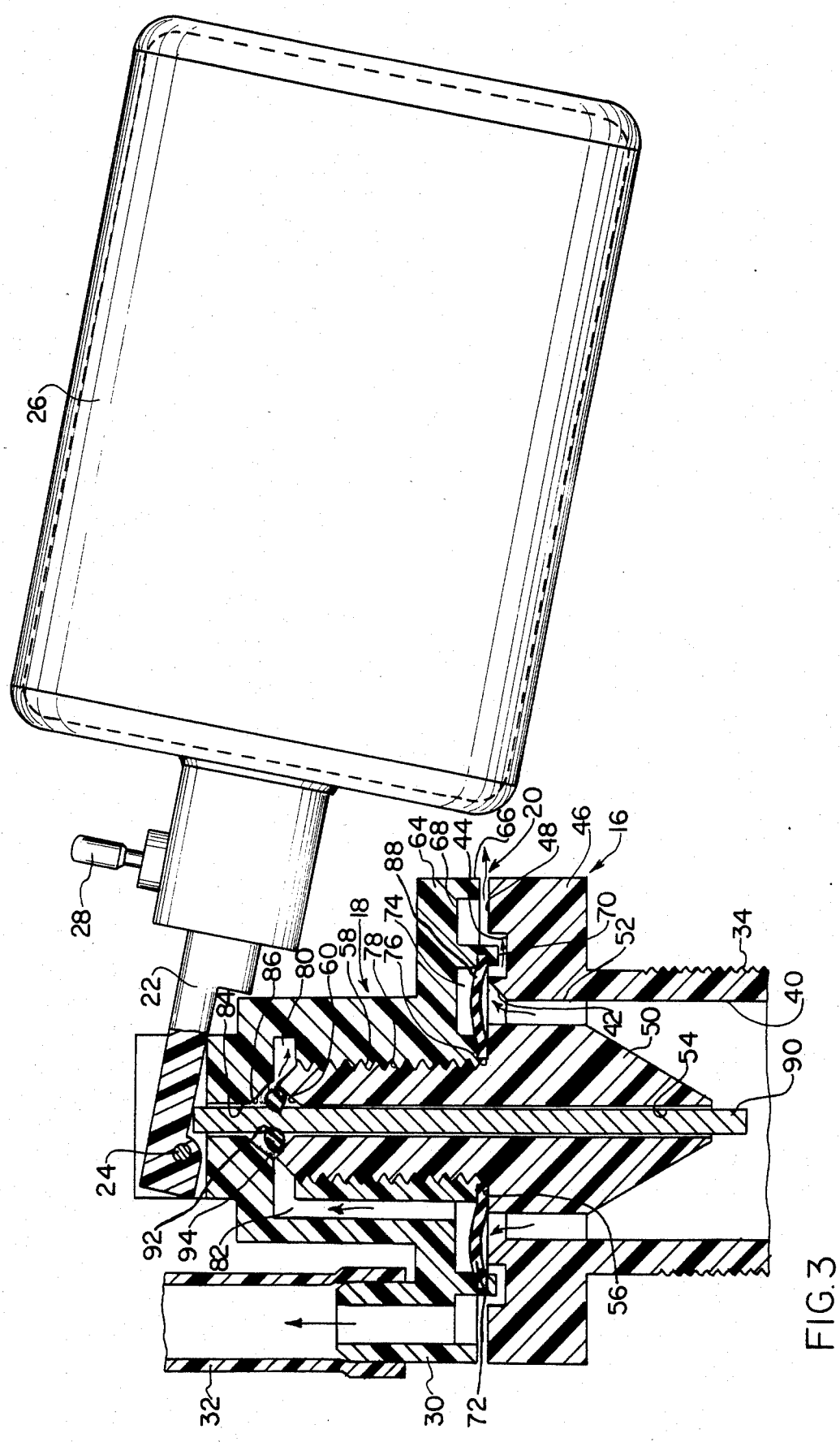
FIG. 3 is a view like FIG. 2 showing the valve in the open position.

Referring now to FIGS. 2 and 3, the lower housing has an interior bore 40 through which water enters from the water supply pipe. A circular valve seat 42, an annular recess 44 and a top surface 48 are formed above the interior bore 40 and on the upper part of an annular lateral flange 46.

A core 50 is provided within the lower housing 16 and extends above the valve seat 42. A plurality of vertical holes 52 are provided between the core 50 and the interior bore 40 for passage of water from the interior bore 40 to the circular valve seat 42. The core 50 has an annular shoulder 56 at a central portion thereof and an upper threaded portion 58 terminating in a beveled surface 60. A central bore 54 extends vertically through the core 50.

The upper housing 18 has a lower circular flange 64 which includes an annular bottom surface 66, an annular recess 68, a depending support 70 with an annular recess 72, an anular recess 74 and a lower shoulder 76. The support 70 extends into the annular recess 44. A threaded inner bore 78 extends upwardly from the lower shoulder 76 and terminates in an annular recess 80. A number of vertical holes 82 extend between the annular recess 80 and the annular recess 74 to communicate water pressure therethrough. An upper bore 84 extends from the upper portion of the upper housing 18. A beveled surface 86 connects the upper bore 84 with the annular recess 80. As shown, the threaded inner bore 78 is threaded onto the upper threaded portion 58 of the core 50 to secure the upper housing 18 to the lower housing 16.

An annular flexible valve element 88 is positioned between the upper housing 18 and the lower housing 16 to provide for control of water flow therebetween and to the discharge gap 20. The valve element 88 is sized to fit snugly within the annular recess 72 of the depending support 70 at its outer circumference and to fit between the annular shoulder 56 of the lower housing 16 and the lower shoulder 76 of the upper housing 18. As seen in FIG. 2, the valve element 88 is adapted to bear against the circular valve seat 42 to close off the flow of water between the interior bore 40 and the annular recess 44.

A pilot rod 90 is mounted within the central bore 54 for reciprocatory movement therein and extends through the upper bore 84 to bear against the underside of the lever arm 22. The diameter of the pilot rod 90 is selected so as to provide a loose fitting within the central bore 54 and the upper bore 84. Water is thus permitted to pass between the pilot rod 90 and the central bore 54 and between the pilot rod 90 and the upper bore 84.

The pilot rod 90 has a circular groove 92 at an upper portion thereof in registry with the annular recess 80. An O-ring 94 is snugly seated in the circular groove 92 and is adapted to bear against the beveled surface 86 in one position illustrated in FIG. 2 and to bear against the beveled surface 60 in another position as illustrated in FIG. 3.

Figure 4:
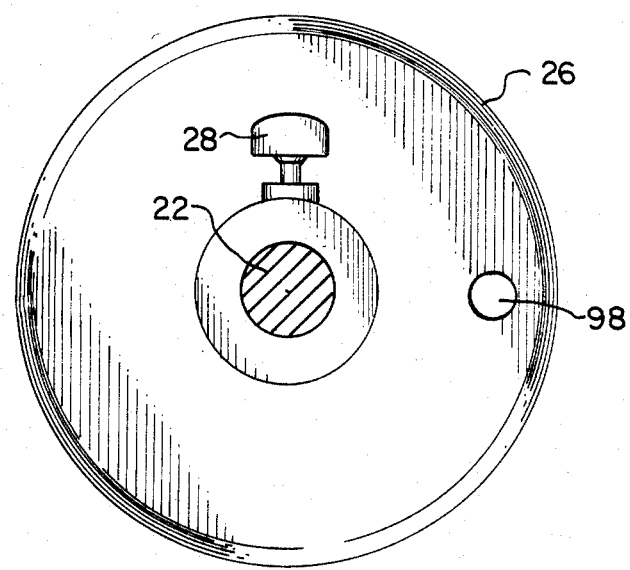
FIG. 4 is an enlarged view taken along lines 4—4 of FIG. 1.

With reference to FIG. 4, the hollow float 26 has a hole 98 in one surface thereof near the outer circumference. The hole 98 permits water to enter the interior of the float and thus the float will be filled with water up to the position of the hole. The float 26 is rotatably mounted on the lever arm 22 so that the position of the hole 98 with respect to the lever arm 22 can be varied as desired and then fixed in place with the thumb screw 28. Thus, the level of water within the float 26 can be adjusted by adjusting the rotational position of the float 26 with respect to the lever arm 22. The amount of water within the float 26 controls the position of the lever arm with respect to the water when the tank is filling. With more water in the float, the water level in the tank will rise further before the lever arm 22 reaches its maximum position illustrated in FIG. 2.

Referring now to FIG. 2, the operation of the ball cock valve will be described. In FIG. 2, the valve is shown in the closed position. Water pressure will be applied to the underside of the annular flexible valve element 88 through the annular opening defined by the valve seat 42 and the annular shoulder 56. Water pressure will also be applied to the top of the valve element 88 from a pressure chamber defined by annular recess 74. The water in the pressure chamber at the top of the valve element 88 is provided by communication through the central bore 54, through annular recess 80 and through vertical holes 82. The area on which water pressure is applied to the valve element 88 is greater on top of element 88 than below element 88. Thus, so long as the water pressure in the annular recess 74 equals the water pressure in the interior bore 40, the valve element 88 will remain firmly seated on the circular valve seat 42 and thus prevent flow of water through the discharge gap 20.

The pressure in the bore 40 will also bear against the bottom of the pilot rod 90 and force the rod upwardly against the underside of the lever arm 22. When the lever arm 22 is in its raised position as illustrated in FIG.

2, the O-rings 94 will bear against the beveled surface 86 and thereby close off the flow of water through the bore 84. In this manner, the pressure of the water in the annular recess 80 and in the annular recess 74 above the valve element 88 will remain the same as the pressure of the water beneath the valve element 88.

When the water closet is flushed, the lever arm will drop in conventional fashion to the position illustrated in FIG. 3. This movement of the lever arm 22 drives the pilot rod 90 downwardly to the position illustrated in FIG. 3 so that the O-ring 94 bears against the beveled surface 60. Thus, the flow of water through the central bore 54 is closed off. At the same time, communication between the tank and the annular recess 80 is opened through upper bore 84, thereby causing the water pressure above the valve element 88 to drop. Thus, the bore 84 can be considered as a relief opening for the pressure chamber above the valve element 88. The pressure beneath the valve element 88 will force the valve element 88 upwardly from contact with the valve seat 42 and allow the water to flow thereover, through the annular recess 44 and between the surfaces 66 and 48. The water flows equally all around the discharge gap 20 so that tank filling takes place efficiently and quietly. At the same time, the water will flow through the back-fill outlet 30 and through the back-fill tube 32 to fill the bowl.

As the water level in the tank rises, the lever arm will rise. At the same time, the pilot rod 90 will rise until it reaches the position illustrated in FIG. 2. At this point, the pressure above and below the valve element 88 will equalize, thereby closing off the valve as illustrated in FIG. 2.

The invention provides a simply pilot-operated valve for controlling the flow of water into a water closet. The valve housing can be injection molded out of plastic material and be finished with a minor amount of machining. The o-ring and the valve element 88 are standard parts which can be purchased inexpensively. The valve has few moving parts and thus is not subject to wear. Manufacture of the valve from plastic will minimize corrosion problems. Thus, the simple and inexpensive valve is durable and very functional.

The pilot rod 90 provides a carrier for the O-ring and also provides a narrow annular channel for pilot water to flow. Clogging of the channel is avoided by the size of the channel and also by the reciprocating motion of the rod 90 during operation of the valve. The O-ring 94 provides a small, yet very sensitive, seal against the beveled sealing surfaces 86 and 60. The small sealing surfaces are less susceptable to leakage and are very sensitive due to the steep angle of the sealing surfaces 86 and 60.

The sealing of the O-ring 94 against the beveled surface 60 to thereby seal the flow of pilot water into the pressure chamber above the valve element 88 enhances the smooth operation of the valve in that it prevents chattering of the valve. If pilot water should seep into the pressure chamber while the filling operation is taking place, it could cause a momentary closing of the valve and then cause a chattering of the valve element.

Whereas the invention has been described with reference to a particular embodiment, the principles of the invention can be carried out with different configurations. For example, the core 50 can be eliminated so that the valve element extends to the center of the lower housing 16 and has an opening through which the pilot rod 90 extends. The upper and lower housings would in that case be secured together with other means at the outer circumference thereof.

Reasonable variation and modification are possible within the scope of the foregoing disclosure and drawings without departing from the spirit of the invention.

The embodiments of the invention in which an exclusive property or privilege is claimed are defined as follows:

1. A pilot-operated ball cock valve having:
   a housing with an inlet opening for receiving fluid from a source, an outlet opening for discharging fluid into a water closet, a passage including a valve seat between the inlet and the outlet openings;
   a flexible valve element having first and second sides and mounted on the downstream side of said valve seat for movement between a closed position, blocking off flow of fluid between said inlet and outlet openings, and an open position allowing fluid to flow between said inlet and outlet openings;
   said first side of said flexible valve element being exposed to fluid pressure through an opening in said valve seat;
   means forming a pressure chamber in said housing and defining a pressure area on the second side of said flexible valve element, said pressure area being greater than said valve seat opening so that said flexible valve element is maintained in said closed position when fluid pressure on the first and second sides of said flexible valve element is equal;
   a relief passage through said housing and communicating with said pressure chamber;
   a pilot conduit, defined within said housing and separate from said valve seat opening, between said inlet opening and said pressure chamber;
   a pilot valve in said relief opening, said pilot valve being operated by an actuator means, for controlling the flow of fluid through said relief opening;
   said relief passage and said pilot conduit having aligned openings and said relief passage forming a valve seat;
   an open space being formed in said pressure chamber between said aligned openings in said relief passage and said pilot conduit; a movable rod slidable in said aligned openings and a valve sealing member carried by said rod, said valve sealing member adapted to reciprocte only in said open space and to seat on said relief passage valve seat to seal off said relief passage in one position of said rod and, alternatively, to permit fluid flow through said relief passage in another position of said rod;
   whereby said inlet opening communicates with said pressure chamber and said relief passage is sealed when said pilot rod is in said one position and said relief passage is open to vent said pressure chamber when said pilot rod is in said another position; and
   the improvement in said pilot valve comprising, said housing is formed in upper and lower sections which are separable from each other, the open space is formed between the upper and lower sections and the relief passage valve seat is formed by the upper section.

2. A pilot-operated valve according to claim 1 wherein said valve sealing member is adapted to seal off said pilot conduit opening in said another position of said rod.

3. A pilot-operated ball cock valve according to claim 2 wherein said housing further defines a central core and said pilot conduit is formed through said core.

4. A pilot-operated ball cock valve according to claims 1, 2 or 3 wherein said valve sealing member is an O-ring.

5. A pilot-operated ball cock valve according to claim 4 and further comprising a groove on said rod receiving said O-ring.

6. A pilot-operated ball cock valve according to claim 3 wherein said central core extends upwardly from said lower section and has a threaded outer surface; said upper section has an annular receiving portion with an internal thread to threadably receive said threaded surface of said core and thereby secure said upper and lower sections of said housing together.

7. A pilot-operated ball cock valve according to claim 6 wherein said flexible valve element is received and clamped between said upper and lower housing sections.

8. A pilot-operated ball cock valve according to claim 7 wherein said outlet opening is a circular separation between said upper and lower sections.

9. A pilot-operated ball cock valve according to claim 8 wherein said actuator means comprises an arm pivotably mounted to an upper portion of said housing and in contact with said rod; a hollow float rotatably mounted on said arm and an opening in said float near a radial outer portion thereof to adjust the buoyancy of said float.

10. A pilot-operated ball cock valve according to claim 9 and further comprising means to selectively fix said float in any rotational position on said arm.

11. A pilot-operated ball cock valve according to claim 1 wherein said actuator means comprises an arm pivotably mounted to an upper portion of said housing and in contact with said rod; a hollow float rotatably mounted on said arm and an opening in said float near a radial outer portion thereof to adjust the buoyancy of said float.

12. A pilot-operated ball cock valve according to claim 11 and further comprising means to selectively fix said float in any given rotational position on said arm.

13. A pilot-operated ball cock valve according to claim 1 wherein a central core extends upwardly from said lower section and has a threaded outer surface; said upper section has an annular receiving portion with an internal thread to threadably receive said threaded surface of said core and thereby secure said upper and lower sections of said housing together.

14. A pilot-operated ball cock valve according to claim 13 wherein said flexible valve element is received and clamped between said upper and lower housing sections.

15. A pilot-operated ball cock valve according to claim 14 wherein said outlet opening is a circular separation between said upper and lower sections.

* * * * *